(12) United States Patent
Schliwa et al.

(10) Patent No.: US 8,401,742 B2
(45) Date of Patent: Mar. 19, 2013

(54) RECONFIGURATION OF CABIN LAYOUTS

(75) Inventors: Ralf Schliwa, Dollern (DE); Tobias Mayer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/240,986

(22) Filed: Sep. 22, 2011

(65) Prior Publication Data

US 2012/0072079 A1 Mar. 22, 2012

Related U.S. Application Data

(63) Continuation of application No. PCT/EP2010/053163, filed on Mar. 12, 2010.

(60) Provisional application No. 61/162,788, filed on Mar. 24, 2009.

(30) Foreign Application Priority Data

Mar. 24, 2009 (DE) .......................... 10 2009 014 606

(51) Int. Cl.
*B64D 11/06* (2006.01)

(52) U.S. Cl. ...... 701/49; 701/36; 244/117 R; 244/118.1; 244/118.2; 244/118.5; 244/118.6; 297/232; 297/248; 297/251

(58) Field of Classification Search ........................ None
See application file for complete search history.

(56) References Cited

U.S. PATENT DOCUMENTS

| | | | | |
|---|---|---|---|---|
| 4,936,527 A * | 6/1990 | Gorges | ........................ | 244/118.6 |
| 5,611,589 A * | 3/1997 | Fujii et al. | ........................ | 296/64 |
| 6,194,853 B1 * | 2/2001 | Tual et al. | ...................... | 318/266 |
| 7,083,146 B2 | 8/2006 | Hiesener | | |
| 7,137,594 B2 * | 11/2006 | Mitchell et al. | ............ | 244/118.6 |
| 7,194,391 B2 * | 3/2007 | Conchi et al. | ...................... | 703/2 |
| 7,232,094 B2 | 6/2007 | Bishop et al. | | |
| 8,186,760 B2 * | 5/2012 | Kneller et al. | ........... | 297/411.32 |
| 8,220,741 B2 * | 7/2012 | Barmichev et al. | ........ | 244/118.6 |
| 2002/0161563 A1 * | 10/2002 | Elabiad et al. | ...................... | 703/8 |
| 2003/0018454 A1 * | 1/2003 | Winkler et al. | ...................... | 703/1 |
| 2003/0075964 A1 * | 4/2003 | Piaulet et al. | ............ | 297/362.11 |
| 2004/0036330 A1 * | 2/2004 | Itami et al. | ...................... | 297/243 |
| 2004/0195450 A1 * | 10/2004 | Hiesener | ...................... | 244/118.5 |
| 2005/0055180 A1 * | 3/2005 | Pischke et al. | ...................... | 703/1 |
| 2005/0061914 A1 * | 3/2005 | Bishop et al. | ............ | 244/118.5 |
| 2005/0178910 A1 * | 8/2005 | Sprenger | ...................... | 244/118.6 |
| 2006/0032979 A1 | 2/2006 | Mitchell et al. | | |
| 2006/0102785 A1 * | 5/2006 | Butt | ........................ | 244/118.6 |

(Continued)

FOREIGN PATENT DOCUMENTS

DE 10307870 A1 9/2004
DE 102007052598 A1 5/2008

(Continued)

OTHER PUBLICATIONS

International Search Report dated Jul. 21, 2010 for International Application No. PCT/EP2010/053163.

(Continued)

*Primary Examiner* — Jonathan M Dager
(74) *Attorney, Agent, or Firm* — Ingrassia Fisher & Lorenz P.C.

(57) ABSTRACT

A control and monitoring system is provided in the aircraft cabin and controls a reconfiguration process with corresponding software in combination with reconfiguration data received from the ground personnel. The control is realized, for example, with a suitable light signals and the unlocking of the seats at certain times. All work sequences are acoustically and/or optically displayed such that the reconfiguration can also be carried out by untrained personnel.

15 Claims, 4 Drawing Sheets

U.S. PATENT DOCUMENTS

| | | | |
|---|---|---|---|
| 2006/0102787 A1* | 5/2006 | Young et al. ................... | 244/119 |
| 2006/0103193 A1* | 5/2006 | Kramer ....................... | 297/217.3 |
| 2007/0295863 A1* | 12/2007 | Thompson ................. | 244/118.6 |
| 2009/0108649 A1* | 4/2009 | Kneller et al. .............. | 297/217.6 |
| 2009/0283636 A1* | 11/2009 | Saint-Jalmes et al. ...... | 244/118.5 |
| 2011/0010135 A1* | 1/2011 | Boin ................................. | 703/1 |
| 2011/0017869 A1* | 1/2011 | Gonnsen et al. ........... | 244/118.6 |
| 2011/0062285 A1* | 3/2011 | Herzog et al. .............. | 244/118.6 |
| 2011/0068227 A1* | 3/2011 | Kneller et al. ............. | 244/118.6 |
| 2012/0041619 A1* | 2/2012 | Rudduck et al. ................... | 701/3 |
| 2012/0239354 A1* | 9/2012 | Sieben .............................. | 703/1 |

FOREIGN PATENT DOCUMENTS

| | | |
|---|---|---|
| DE | 102009014606 A1 | 10/2010 |
| EP | 1452444 A1 | 9/2004 |
| JP | 2279433 A | 11/1990 |
| WO | 03074357 A1 | 9/2003 |

OTHER PUBLICATIONS

German Office Action dated Oct. 12, 2009 for German Application No. 102009014606.7.

* cited by examiner

RECONFIGURATION OF CABIN LAYOUTS

CROSS-REFERENCE TO RELATED APPLICATION

This application is a continuation of International Application No. PCT/EP2010/053163, filed Mar. 12, 2010, which was published under PCT Article 21(2) and which claims priority to German Patent Application No. 102009014606.7 filed Mar. 24, 2009 and of U.S. Provisional Patent Application No. 61/162,788 filed Mar. 24, 2009, the disclosure of which applications is hereby incorporated herein by reference.

TECHNICAL FIELD

The technical field pertains to the reconfiguration of cabins of a means of transport. The technical field specifically pertains to a semi-automated method for reconfiguring a cabin layout of a passenger cabin of a means of transport, to a control and monitoring system for reconfiguring a cabin layout in an at least partially automated fashion, as well as to an aircraft.

BACKGROUND

The reconfiguration of passenger seats in an aircraft or other means of transport is relatively complicated because aircraft are not specially prepared for this purpose. The positioning of seats, the adaptation of seat-to-seat wiring, service channels and the programming of the cabin management system are largely manual activities that prevent an efficient change-over in service ("In Service").

DE 103 07 870 A1 and US 2004/0195450 A1 describe seat row arrangements in a passenger cabin of a commercial aircraft. Seat rows of passenger seats are provided and feature seat parts that can be folded up in order to increase the width of a cross-aisle, if so required. In this way, the seating capacity can be increased because the cross-aisles of the emergency exits can be realized narrower. If the basic cabin layout should be changed, extensive conversion measures are required that can frequently only be carried out by trained personnel and with the aid of corresponding tools.

It is at least one objective to make available a method and a system for the simplified reconfiguration of a cabin layout in a means of transport. In addition, other objectives, desirable features, and characteristics will become apparent from the subsequent summary and detailed description, and the appended claims, taken in conjunction with the accompanying drawings and this background.

SUMMARY

A semi-automated method is disclosed for reconfiguring a cabin layout of a passenger cabin of a means of transport, a control and monitoring system for reconfiguring a cabin layout of a passenger cabin of a means of transport in an at least partially automated fashion and an aircraft with such a control and monitoring system The described embodiments likewise pertain to the method, the control and monitoring system, as well as the aircraft. In other words, the steps described below with reference to the method can also be implemented in the form of corresponding devices in the control and monitoring system in the aircraft. Similarly, characteristics of the devices described below can also be implemented in the form of method steps.

According to one embodiment, a semi-automated method is disclosed for reconfiguring a cabin layout of a passenger cabin of a means of transport. Electronic data with respect to a planned cabin layout is made available to a processing unit (also called arithmetic unit) of the means of transport, a first work step of the reconfiguration to be carried out is automatically communicated to a crew member of the means of transport, the first work step is carried out by the crew member and a second work step of the reconfiguration to be carried out (subsequently) is automatically communicated to the crew member. The term means of transport used above and below refers, for example, to an aircraft such as a helicopter, an airship or an airplane, as well as a watercraft, a rail vehicle or a land craft.

In this way, the activities that originally had to be carried out manually can be simplified and partially automated. The assignment of trained personnel is no longer mandatory. Due to the automatic communication to the corresponding crew member (for example, in the form of acoustic and/or optical signals), the crew member does not have to use any plans, on which the corresponding cabin layout is printed. The planned cabin layout is rather transmitted to the processing unit and the reconfiguration method is subsequently managed, partially controlled and monitored by the processing unit.

According to another embodiment, the data with respect to the planned cabin layout is transmitted to a memory of the processing unit in order to be made available by a terrestrial transmitter. The transmission may be realized, for example, wireless by means of a suitable radio transmission technology or in a wire-bound fashion. In case of a wireless transmission, for example, the data is encrypted so as to reduce the risk of data abuse.

According to another embodiment, the communication of the first and the second work step to be carried out is at least partially realized optically. According to another embodiment, the optical signal has a signal in the region of a seat to be displaced next. For example, corresponding lamps are arranged above, adjacent to or on the seats. The lamp at the seat to be displaced next flashes if this seat is next in line to be displaced. Similarly, a stop signal blinks when the seat is situated in the desired position. In this way, the crew member merely needs to follow the light signals in order to change the cabin layout.

According to another embodiment, the optical signal has a signal projected by a projector. It would be possible, for example, to only provide a small number of projectors that can be pivoted and project the starting and end positions for the corresponding seats onto the ceiling or onto the wall under the control of the processing unit. It is also possible, for example, to arrange an OLED-strip on the overhead luggage compartments and to display the positions of the seat to be displaced next thereon.

According to another embodiment, the first work step comprises a displacement of a seat. An electric unlocking of the seat takes place prior to the displacement of the seat, and an electric locking of the seat takes place subsequent to the displacement of the seat.

According to another embodiment, the unlocking and the locking of the seat take place automatically. For example, the position of the seat to be displaced next is displayed to the crew member in the form of a corresponding light signal above the seat. The seat is at the same time automatically unlocked. The crew member now displaces the seat into the desired end position, whereupon a stop signal sounds or is displayed. Subsequently, the seat is automatically locked again.

According to another embodiment, the unlocking and the locking of the seat are realized with the aid of a locking mechanism that is moved from a locking position into an unlocking position (and vice versa) by a memory metal element. Such a memory metal element can be bent by applying an electric voltage such that the locking mechanism is triggered. If the voltage is switched off, the locking mechanism is once again released (this time in the opposite direction).

According to another embodiment, it is also automatically checked whether or not the first work step was carried out correctly and this check is followed by the transmission of corresponding feedback to the crew member. In this way, the crew member is provided with feedback as to whether or not the corresponding seat is already situated in the correct position.

According to another embodiment, the feedback comprises an acoustic signal. The feedback may additionally or alternatively take place optically, for example, in the form of a flashing or permanently illuminated light signal.

According to another embodiment, a position of the seat also is automatically determined during a displacement of the seat. In this way, the system can automatically determine when the seat is situated in the desired position such that corresponding feedback can be transmitted to the crew member.

According to another embodiment, a control and monitoring system for reconfiguring a cabin layout of a passenger cabin of a means of transport in an at least partially automated fashion is disclosed. The control and monitoring system features a processing unit for receiving electronic data with respect to a planned cabin layout. An output device is furthermore provided. The output device is in combination with the processing unit designed for automatically communicating a first work step of the reconfiguration to be carried out on the basis of the planned cabin layout to a crew member. The output device is furthermore designed for automatically communicating a second work step of the reconfiguration to be carried out to the crew member in combination with the arithmetic unit once the first work step is completed.

Detection devices or position determination devices, in particular, in the form of a suitable sensor system may be provided in order to determine whether or not the seat is situated in the desired position.

According to another embodiment, an aircraft is disclosed with a control and monitoring system of the type described above and below.

BRIEF DESCRIPTION OF THE DRAWINGS

The present invention will hereinafter be described in conjunction with the following drawing figures, which are not to scale and where like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
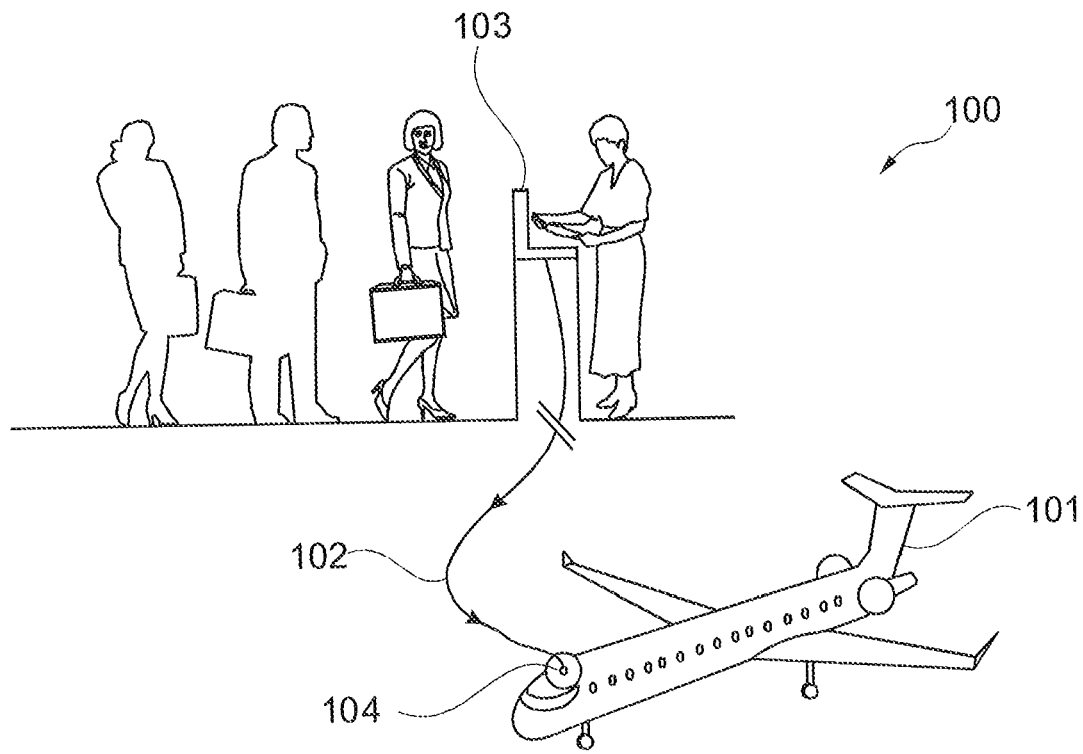
FIG. 1 shows a control and monitoring system according to an exemplary embodiment.

FIG. 1 shows a control and monitoring system 100 according to an embodiment. The control and monitoring system 100 features a terrestrial input and transmission unit 103 that can be operated by ground personnel. The corresponding cabin layout is defined by means of this unit 103, for example, during the check-in of passengers. The calculated desired cabin layout is then transmitted on a data line 102 to the processing unit in the aircraft via an interface 104 of the aircraft 101.

This means that layout changes to the cabin layout that already exists in the aircraft are initially identified. The (new) cabin layout information is subsequently, simultaneously or previously uploaded into the aircraft 101 (data upload). This data is then used for the fast reconfiguration and made available to several systems and devices of the control and monitoring system.

Figure 2:
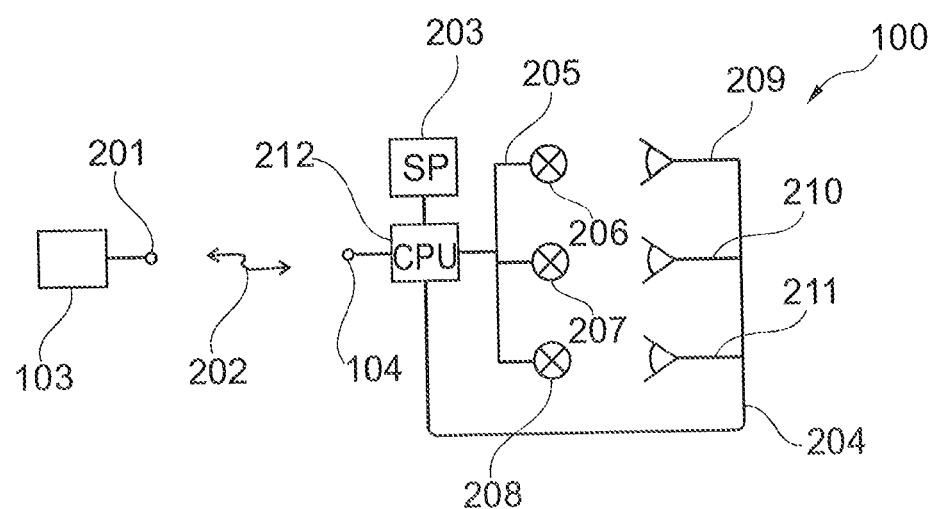
FIG. 2 shows a schematic diagram of a control and monitoring system according to an exemplary embodiment.

FIG. 2 shows another illustration of the control and monitoring system 100. The data transmission between the terrestrial input and control unit 103 may also take place via a radio link 202 with the aid of a wireless interface 201. The on-board processing unit 212 receives the data set that is subsequently stored, for example, in a memory element 203.

The processing unit 212 is on the one hand connected to the output devices 207, 207, 208 via a data bus 205. These output devices make it possible to transmit optical and/or acoustical, haptical or other signals to the cabin crew in order to signal to the crew members which seats should be displaced from which location to which location at what time. The processing unit 212 is furthermore connected to several detection units 209, 210, 211 (see data bus 204). These detection units consist, for example, of optical sensors, inductive sensors or even linear position transmitters or navigation systems that utilize, for example, satellite navigation software in order to determine the position of the corresponding seats.

Figure 3:
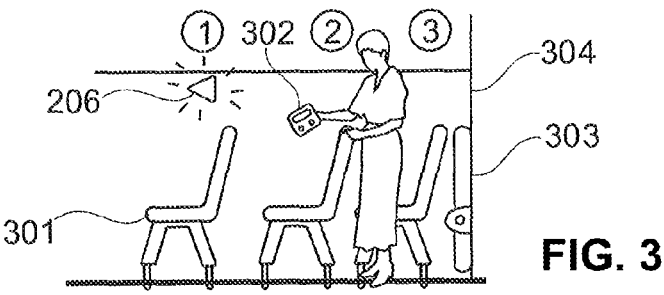
FIG. 3 shows a first method step according to an embodiment.

FIG. 3 shows another methodical step. The crew member carries a portable control device 302 that makes it possible, for example, to lock and unlock the locking mechanisms 401, 402 (see FIG. 4) of the individual seats.

A symbol 206 is illuminated above the front seat 301. The symbol 206 signals to the crew member that the seat 301 should be displaced forward. The symbol 206 may consist, for example, of an illumination that is activated. However, the symbol 206 may also be projected onto the wall paneling by a projector that is integrated, for example, into one of the seats.

FIG. 3 shows that a folding seat 303 is situated on the wall 304, wherein this folding seat is "folded away" in the cabin layout according to FIG. 3 and not used. The work sequence to be carried out is displayed, for example, on a display in the service channel of the passenger cabin and/or projected onto the sidewall, e.g., by a miniature projector in the seat backrest of one of the seats and/or on the seat itself (for example, in the form of a red or green LED, an IFE-screen, etc.). When the seat is correctly positioned, feedback takes place via the output device 207. Alternatively or additionally to an optical feedback, this may also concern an acoustical feedback in the form of a signal tone.

Figure 4:
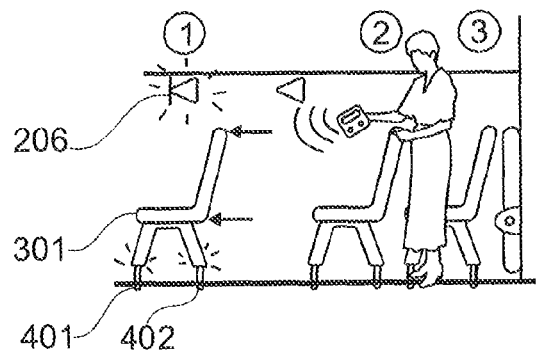
FIG. 4 shows a second method step according to an embodiment.

This is illustrated in FIG. 4. The signal indicates that the seat is situated in the desired forwardly displaced position. The seat is then once again locked on the seat rails. Once this has taken place, the next work step is displayed.

The adaptation or change of the cabin layout is carried out, for example, in several steps. The seat to be displaced or the seats to be displaced initially need to be unlocked. This unlocking process, as well as the subsequent locking process, is realized, for example, with the aid of a memory metal locking element. For this purpose, a corresponding energy source in the form of a battery and, for example, a remotely controllable switch may be provided, for example, in the seat in addition to the memory metal locking element. The locking mechanism may also be centrally controlled by the management and control system in an automated fashion, for example, from the Flight Attendant Panel (FAP). In this case, the locking and unlocking processes take place in a fully automated fashion (see FIG. 4). A manual unlocking tool can also be used. Similarly, it would be possible to provide a central locking system for each seat. Alternatively, each seat base can be locally unlocked.

Figure 5:
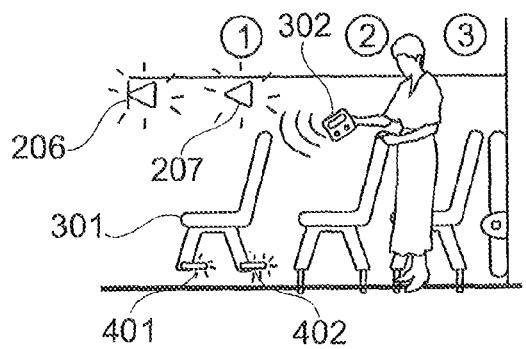
FIG. 5 shows a third method step according to an embodiment.

FIG. 5 shows the unlocking of the seat 301 that is remotely controlled by the crew member via the device 302. The symbol 206 indicates that the seat 301 should be displaced forward. The symbol 206 indicates the position, to which the seat 301 needs to be displaced.

Figure 6:
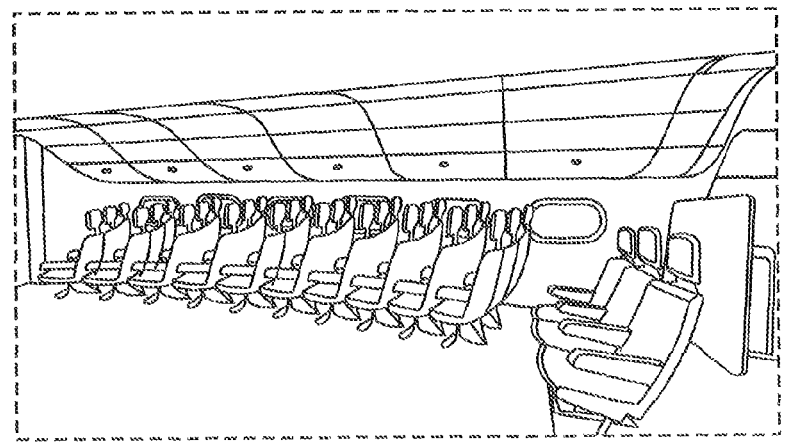
FIG. 6 shows part of an aircraft cabin with a control and monitoring system according to an embodiment.

FIG. 6 shows part of an aircraft cabin, into which a control and monitoring system is installed. According to an embodiment, the position of the seats can be changed without having to remove the seats from the seat rails. In order to reconfigure the economy class into the business class, for example, one or more seats (in the front or the rear) are removed. This is illustrated in FIG. 6.

Figure 7:
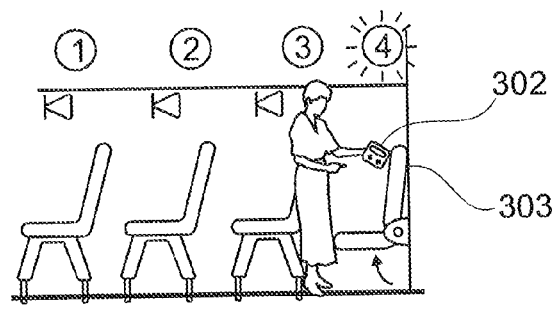
FIG. 7 shows another method step according to an embodiment.
Figure 8:
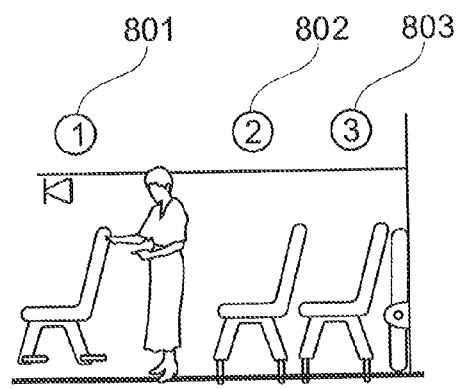
FIG. 8 shows another method step according to an embodiment.

Alternatively, a folding seat 303 can be folded up in order to create more seat space for the remaining seats (see FIG. 8). FIG. 7 shows the folding seat 303 in the unfolded, usable state. This folding function can also be remotely controlled via the device 302. The illuminated symbol 4 in FIG. 7 signals to the crew member that the folding seat should now be folded up.

Figure 12:
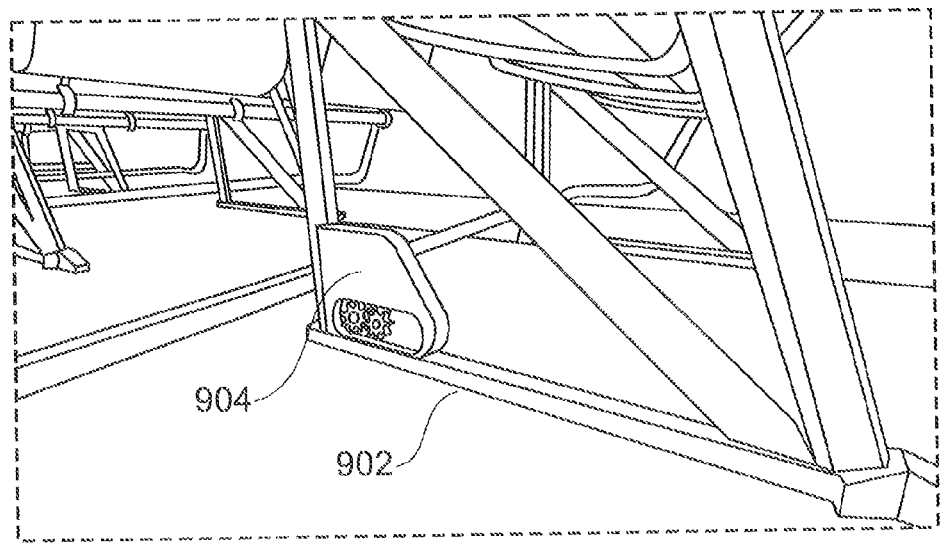
FIG. 12 shows a detailed representation of the lower region of an aircraft seat according to an embodiment.

After folding up the folding seat 303, the seat spacing between the remaining seats can be increased. This is either realized manually in the form of a displacement by the crew member (see FIG. 8) or automatically, for example, in that the individual seats are connected to a corresponding transport chain or feature their own motors that can displace the respective seat along the seat rails (such a motor is illustrated, for example, in FIG. 12; see reference symbol 904, as well as the corresponding seat rail 902).

According to FIG. 8, the crew member is signaled that the front seat should be displaced first (see reference symbol 801). Subsequently, the second seat should be displaced (see reference symbol 802) and the rear seat is ultimately displaced slightly toward the rear (see reference symbol 803).

Figure 9:
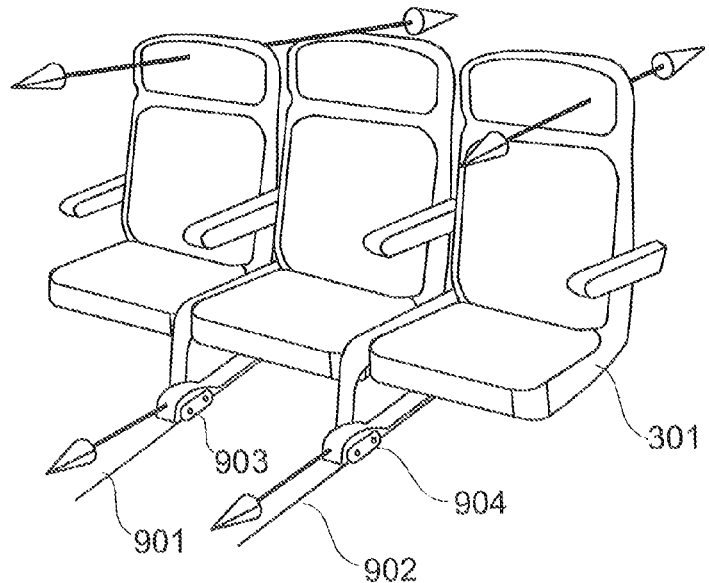
FIG. 9 shows a row of seats that can be displaced along the seat rails.

FIG. 9 shows a seat row with three seats that are mounted on seat rails 901, 902 and can glide along the seat rails by means of the drives 903, 904. If the seat spacing should be reduced, for example, in order to change the business class configuration into the economy class configuration, the foremost seat row is initially displaced farther toward the front by a certain distance. Then the next seat row is displaced followed by the next seat row, etc. Ultimately, the folding seat 303 is unfolded. Other seats can be inserted if such a folding seat is not provided.

Due to the seat rail principle used, the displacement is not dependent on structural details of the seat rails. However, the seat mounting needs to structurally match the corresponding seat rails. For example, linear rails may be provided in the aircraft seat rail. It is also possible to use classic seat rails that, if applicable, are provided with a corresponding coating in order to improve the sliding properties of the seats along the rails. Other suitable seat rails may also be used.

Figure 10:
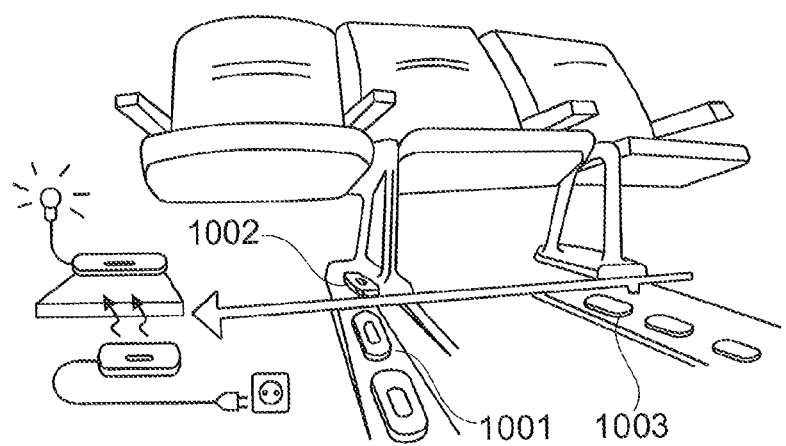
FIG. 10 shows a row of seats with part of the control and monitoring system according to an embodiment.

The position of the seats is determined, for example, by means of an inductive supply of the seats. This is illustrated in FIG. 10. Inductive receivers 1002 are arranged in the seat rails in order to receive energy from the inductive sources 1001, 1003 of the seat rails such that the electrical consumers of the seats can be supplied with energy in a contactless fashion. This principle can also be used for detecting the position of the seat rows.

The positions of the seats can also be detected by means of satellite navigation receivers. Satellite reception is not absolutely necessary for this purpose. The system may also consist of an on-board navigation system of the aircraft that does not use satellites as reference points, but rather transmitters that are permanently installed in the aircraft, however, in accordance with the satellite navigation principle. Linear position transmitters may be additionally or alternatively used for determining the seat position.

Figure 11:
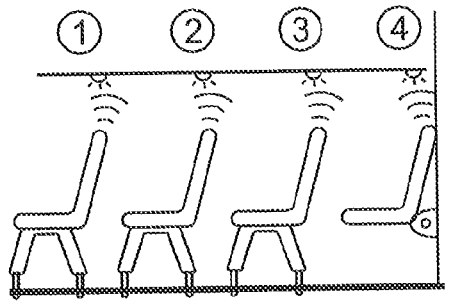
FIG. 11 shows a method step according to another embodiment.

After each work step is completed, the results are checked, particularly whether the corresponding seat/the corresponding seat row is situated in the correct position and whether the seats are once again locked in the required fashion. This check may take place in a fully automated fashion, for example, with a corresponding sensor system. This check may also be realized in the form of a visual inspection by the crew member. After the check is completed, the crew member can confirm the work step such that the control and monitoring system can initiate the next work step. This is illustrated, for example, in FIG. 11.

As a supplement, it should be noted that "comprising" and "featuring" do not exclude any other elements or steps, and that "a" or "an" does not exclude a plurality. It should furthermore be noted that characteristics or steps that were described with reference to one of the above embodiments can also be used in combination with other characteristics or steps of other above-described embodiments.

While at least one exemplary embodiment has been presented in the foregoing summary and detailed description, it should be appreciated that a vast number of variations exist. It should also be appreciated that the embodiment or embodiments are only examples, and are not intended to limit the scope, applicability, or configuration in any way. Rather, the foregoing summary detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A semi-automated method for a reconfiguring a cabin layout of a passenger cabin of a transport, the method comprising:
   making available electronic data with respect to a planned cabin layout to a processing unit of the transport;

determining positions of seats by with detection units;
automatically communicating a first work step of the reconfiguring to be carried out to a crew member with an optical signal in a region of a seat that is to be displaced next;
automatically determining whether the seat is in a correct position and locked correctly;
generating a feedback signal to a cabin crew using an output device when the seat is in the correct position; and
automatically communicating a second work step of the reconfiguring to be carried out to the crew member.

2. The method of claim 1,
wherein data with respect to the planned cabin layout is transmitted from a terrestrial transmitter to a memory of the processing unit for availability.

3. The method of claim 1,
wherein the automatically communicating of the first work step and the second work step is at least partially performed optically.

4. The method of claim 3,
wherein the optical signal is a signal in the region of the seat to be displaced next.

5. The method of claim 3,
wherein the optical signal is a signal projected by a projector.

6. The method of claim 1,
wherein the first work step comprises a displacement of the seat,
wherein the seat is electrically unlocked prior to the displacement of the seat, and
wherein the seat is electrically locked subsequent to the displacement of the seat.

7. The method of claim 6,
wherein the unlocking and the locking take place automatically.

8. The method of claim 6,
wherein the unlocking and locking are realized with an aid of a locking mechanism that is moved from a locking position into an unlocking position with a memory metal element.

9. The method of claim 1, furthermore comprising:
automatically checking whether the first work step was correctly carried out; and
transmitting a corresponding feedback to the crew member.

10. The method of claim 9,
wherein the corresponding feedback comprises an acoustic signal.

11. The method of claim 1, furthermore comprising:
automatically determining a position of the seat during a displacement of the seat.

12. The method of claim 11,
wherein the automatically determining of the position of the seat is realized with an aid of an induction coil.

13. The method of claim 11,
wherein the automatically determining of the position of the seat is realized with an aid of a navigation system.

14. A control and monitoring system for reconfiguring a cabin layout of a passenger cabin of a transport in an at least a partially automated fashion, comprising:
a processing unit configured to receive electronic data with respect to a planned cabin layout;
an output device; and
detection units configured to determine positions of seats,
wherein the output device and the processing unit is configured to automatically communicate a first work step of the reconfiguring to be carried out with an optical signal in a region of a seat that is to be displaced next on a basis of the planned cabin layout to a crew member processing, and
wherein the control and monitoring system is further configured to automatically determine whether the seat is in a correct position and locked correctly, and also configured to generate a feedback signal to a cabin crew using the output device when the seat is in the correct position,
wherein the output device and the processing unit are furthermore designed for automatically communicating a second work step of the reconfiguring to be carried out to the crew member once the first work step is completed.

15. An aircraft, comprising:
a passenger cabin having a cabin layout; and
a control and monitoring system for reconfiguring the cabin layout of the passenger cabin in an at least a partially automated fashion, the control and monitoring system comprising:
a processing unit configured to receive electronic data with respect to a planned cabin layout;
an output device; and
detection units configured to determine positions of seats,
wherein the output device and the processing unit is configured to automatically communicate a first work step of the reconfiguring to be carried out with an optical signal in a region of a seat that is to be displaced next on a basis of the planned cabin layout to a crew member processing, and
wherein the control and monitoring system is further configured to automatically determine whether the seat is in a correct position and locked correctly, and also configured to generate a feedback signal to a cabin crew using the output device when the seat is in the correct position,
wherein the output device and the processing unit are furthermore designed for automatically communicating a second work step of the reconfiguring to be carried out to the crew member once the first work step is completed.

* * * * *